Patented July 26, 1949

2,477,465

UNITED STATES PATENT OFFICE 2,477,465

MANUFACTURING TETRAETHYL LEAD

Roy Joseph Plunkett, Woodstown, N. J., assignor to E. I. du Pont de Nemours & Company, Wilmington, Del., a corporation of Delaware No Drawing. Application March 21, 1946, Serial No. 656,172

6 Claims. (Cl. 260—437)

This invention relates to a process for manufacturing tetraethyl lead and more particularly to catalyzing the ethylation of lead monosodium alloy with ethyl chloride.

In the usual commercial process for manufacturing tetraethyl lead, ethyl chloride is reacted with lead monosodium alloy in a closed vessel under pressure at about 65° C. to about 85° C. This process ordinarily requires 5 or more hours to complete the reaction. In recent years, it has become important to very greatly increase the production of tetraethyl lead. In order to increase such production materially, it has become important and desirable to greatly decrease the time for carrying the reaction to completion. When it has been attempted to decrease the time of reaction in the old processes, the yield of tetraethyl lead from a given batch of alloy is materially decreased and additional and difficult problems of separating the tetraethyl lead from the reaction mass have been encountered.

An object of the present invention is to provide a process whereby the speed of the reaction is materially increased without a substantial decrease in the yield. Another object is to provide a process whereby the time for completion of the reaction may be greatly decreased with a resulting large increase in the production of tetraethyl lead. A further object is to provide new and improved catalysts for the reaction of ethyl chloride with lead monosodium alloy. Other objects are to advance the art. Still other objects will appear hereinafter.

The above and other objects may be accomplished in accordance with my invention which comprises carrying out the reaction of ethyl chloride on lead monosodium alloy in the presence of a small proportion, sufficient to accelerate the reaction, of an acetal which consists of carbon, hydrogen, oxygen and 0 to 2 chlorine atoms. I have found that such acetals are extremely effective catalysts for this reaction, increasing the speed of the reaction to such an extent that the time required for completion of the reaction is reduced to about one hour. At the same time, high yields of tetraethyl lead are obtained and the difficulty of separating the tetraethyl lead from the reaction mass is not increased. Thereby, the production of tetraethyl lead in a plant is very materially speeded and increased.

I have found that the acetals of the above defined class are, as a whole, very effective for accelerating the reaction. The term "an acetal" is employed herein in its generic sense to include the dialiphatic ethers of the hypothetical ethylidene glycol and the analogous ethers of the higher and lower alkylidene glycols. The acetals may be saturated or unsaturated and may contain chlorine, hydroxy and carboxylic ester groups. Preferably, they contain only 2 oxygen atoms. Particularly satisfactory results have been obtained with 1,1-diethoxyethane (acetal) and 2-chloro-1,1-diethoxyethane. Satisfactory results have also been obtained with dimethyl acetal and with dimethoxymethane.

The proportions of the acetals employed may be varied widely and will depend upon the conditions employed and particularly on the size of the batches and the equipment. Generally, they will be employed in the proportion of from about 0.005% to about 0.5% based on the ethyl chloride. If the proportion of the acetals employed are increased substantially above 0.5% in large scale plant operations carried out in an autoclave, they become less effective and may even be detrimental to the yields. Generally, in small scale production in a bomb, larger amounts of the acetals will be effective and may even be desirable. In such small scale production, 1,1-diethoxyethane and 2-chloro-1,1-diethoxyethane have been found to be effective in proportions as high as 1.5% based on the ethyl chloride. However, in substantially all cases, the optimum results are obtained with 1% or less of the acetals.

While the acetals may be added to the reactants or to the reaction vessel in any desired manner and at any desired stage of the process, it will generally be most desirable to add the particular acetal to the ethyl chloride prior to mixing the ethyl chloride with the alloy. Except for the addition of the catalyst and the shorter time required for completion of the process, the process of making the tetraethyl lead will remain unchanged.

In order to more clearly illustrate my invention, preferred modes of carrying the same into effect and the advantageous results to be obtained thereby, the following examples are given:

Example I

Approximately 100 g. of lead-sodium alloy (containing 10.0% sodium) of a size which passed a 4 mesh screen and was retained on a 10 mesh screen, was charged into each of six steel bombs having a capacity of 150 ml. Fifty milliliters of ethyl chloride was added to each bomb and 0.7 cc. of acetal (1,1-diethoxyethane) was added to each of three of them. The bombs were closed and tumbled in a water-bath maintained at 85°

C. for 90 minutes. After the heating period, the hot water was drained and the bath was refilled with cold water. After 15 minutes, the bombs were removed and placed on ice.

Each reaction mass was extracted with 2000 ml. of benzene. A 50 ml. aliquot of the benzene solution was titrated with iodine solution to determine the yield of tetraethyl lead. The yields, in the three bombs containing acetal, were 87.54%, 87.52% and 88.43% while the yields in the other three were 77.66%, 78.34% and 79.19%.

*Example II*

A run was made similar to Example I except that five bombs were charged and 0.4 cc. of methylal (dimethoxymethane) was substituted for acetal in three of them. The yields, in the three bombs containing methylal, were 86.43%, 84.80% and 84.61% while the yields in the other two were 81.06% and 80.87%.

It will be understood that my invention is not to be limited to the specific embodiments disclosed, but that my invention may be modified in various respects without departing from the spirit or scope thereof. For example, other acetals, within the above defined class, will be apparent to those skilled in the art and may be employed in place thereof.

I claim:

1. In the process of making tetraethyl lead by the reaction of ethyl chloride on lead monosodium alloy, the improvement which comprises carrying out the reaction in the presence of a small proportion, sufficient to accelerate the reaction, of an acetal of the class which consists of acetals consisting of carbon, hydrogen and two oxygen atoms and corresponding monochlorine and dichlorine substituted acetals.

2. In the process of making tetraethyl lead by the reaction of ethyl chloride on lead monosodium alloy, the improvement which comprises carrying out the reaction in the presence of a small proportion, sufficient to accelerate the reaction, of an acetal which consists of carbon, hydrogen and two oxygen atoms.

3. In the process of making tetraethyl lead by the reaction of ethyl chloride on lead monosodium alloy, the improvement which comprises carrying out the reaction in the presence of a small proportion, sufficient to accelerate the reaction, of 1,1-diethoxyethane.

4. In the process of making tetraethyl lead by the reaction of ethyl chloride on lead monosodium alloy, the improvement which comprises carrying out the reaction in the presence of a small proportion, sufficient to accelerate the reaction, of dimethoxymethane.

5. In the process of making tetraethyl lead by the reaction of ethyl chloride on lead monosodium alloy, the improvement which comprises carrying out the reaction in the presence of a small proportion, sufficient to accelerate the reaction, of an acetal which consists of carbon, hydrogen, two oxygen atoms and a single chlorine atom.

6. In the process of making tetraethyl lead by the reaction of ethyl chloride on lead monosodium alloy, the improvement which comprises carrying out the reaction in the presence of a small proportion, sufficient to accelerate the reaction, of 2-chloro-1,1-diethoxyethane.

ROY JOSEPH PLUNKETT.

REFERENCES CITED

The following references are of record in the file of this patent:

UNITED STATES PATENTS

| Number | Name | Date |
|---|---|---|
| 1,622,228 | Midgley | Mar. 22, 1927 |
| 1,645,389 | Monroe | Oct. 11, 1927 |
| 1,717,961 | Daudt et al. | June 18, 1929 |
| 1,749,567 | Daudt | Mar. 4, 1930 |

FOREIGN PATENTS

| Number | Country | Date |
|---|---|---|
| 216,083 | Great Britain | Feb. 16, 1925 |

OTHER REFERENCES

Richter's "Organic Chemistry," (ed. by Allott), 3rd ed., 1934, vol. I, pages 241–242.